(12) United States Patent
ito

(10) Patent No.: US 8,212,796 B2
(45) Date of Patent: Jul. 3, 2012

(54) IMAGE DISPLAY APPARATUS AND METHOD, PROGRAM AND RECORDING MEDIA

(75) Inventor: Masaki ito, Tokyo (JP)

(73) Assignee: Sony Corporation, Tokyo (JP)

( * ) Notice: Subject to any disclaimer, the term of this patent is extended or adjusted under 35 U.S.C. 154(b) by 1603 days.

(21) Appl. No.: 11/534,727

(22) Filed: Sep. 25, 2006

(65) Prior Publication Data

US 2007/0070247 A1 Mar. 29, 2007

(30) Foreign Application Priority Data

Sep. 29, 2005 (JP) ................ P2005-283368

(51) Int. Cl.
G09G 5/00 (2006.01)
(52) U.S. Cl. ............. 345/204; 345/55; 345/690
(58) Field of Classification Search .......... 345/204, 345/55, 690
See application file for complete search history.

(56) References Cited

U.S. PATENT DOCUMENTS

| | | | |
|---|---|---|---|
| 2008/0077858 A1* | 3/2008 | Asakawa et al. | 715/255 |
| 2008/0123746 A1* | 5/2008 | Ueda et al. | 375/240.16 |
| 2010/0104199 A1* | 4/2010 | Zhang et al. | 382/199 |

FOREIGN PATENT DOCUMENTS

| | | |
|---|---|---|
| JP | 06-289832 | 10/1994 |
| JP | 09-135395 | 5/1997 |
| JP | 2000-078496 | 3/2000 |
| JP | 2000-115651 | 4/2000 |
| JP | 2000-307896 | 11/2000 |
| JP | 2001-249655 | 9/2001 |
| JP | 2002-077723 | 3/2002 |
| JP | 2002-218349 | 8/2002 |
| JP | 2003-058141 | 2/2003 |
| JP | 2004-021054 | 1/2004 |
| JP | 2004-045634 | 2/2004 |
| JP | 2004-194311 | 7/2004 |
| JP | 2004-198479 | 7/2004 |
| JP | 2005-215557 | 8/2005 |

OTHER PUBLICATIONS

Japanese Office Action issued on Oct. 25, 2011, in connection with corresponding counterpart JP Application No. 2005-283368.

* cited by examiner

Primary Examiner — Nitin Patel
Assistant Examiner — Leonid Shapiro
(74) Attorney, Agent, or Firm — SNR Denton US LLP

(57) ABSTRACT

Disclosed herein is an image display apparatus for displaying an image corresponding to a signal selected by a user from among a plurality of images corresponding to a plurality of input signals. The apparatus includes: a selection outputter for outputting a signal selected from among the plurality of signals on the basis of the selection; a feature quantity calculator for calculating a feature quantity indicative of a status of an image corresponding to the signal outputted by the selection outputter; a status determiner for determining the status of the image on the basis of the feature quantity calculated by the feature quantity calculator; and an image quality changer for changing a parameter for identifying an image quality of the image on the basis of the signal outputted by the selection outputter and a determination result obtained by the status determiner.

10 Claims, 6 Drawing Sheets

PRIOR ART

F I G . 5
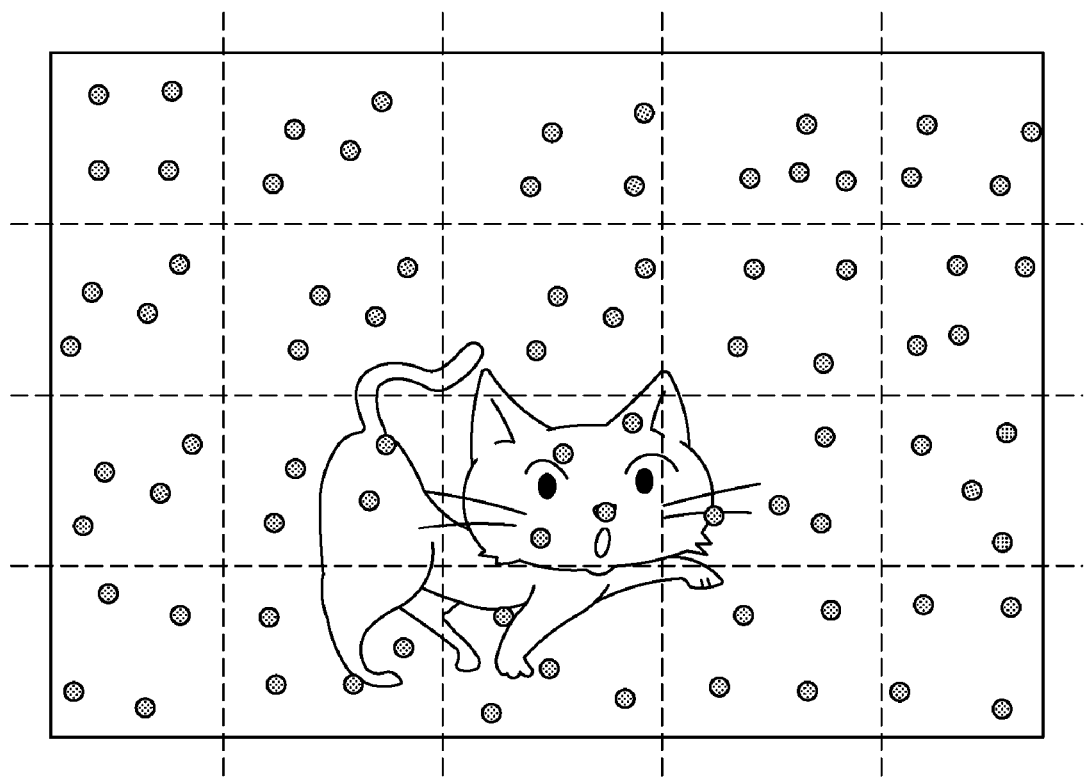

IMAGE DISPLAY APPARATUS AND METHOD, PROGRAM AND RECORDING MEDIA

CROSS REFERENCES TO RELATED APPLICATIONS

The present invention contains subject matter related to Japanese Patent Application JP 2005-283368 filed in the Japanese Patent Office on Sep. 29, 2005, the entire contents of which being incorporated herein by reference.

BACKGROUND OF THE INVENTION

1. Field of the Invention

The present invention relates to an image display apparatus and method, a program, and a recording media, and, more particularly, to an image display apparatus and method, a program, and a recording media that are configured to realize high-speed image input switching as well as image displaying that minimizes the sense of visual discomfort.

2. Description of the Related Art

Recently, television receivers have seen great strides in functional diversification, performance, and device configurational sophistication. Generally, these television receivers executes image quality control by software because software makes it easy to execute modifications and cope with complex specifications. Image quality control is executed by changing the settings of a register holding parameters for specifying preset brightness, color shade, and so on. The register for general use in image quality control is set during a blanking interval that is provided along with input switching or channel switching.

Referring to FIG. 1, there is shown a flowchart describing a related-art image control processing example. In step S1, a television receiver determines whether an image switching command has been received and waits until the command is found received.

If image switching is found executed in step S1, then the procedure goes to step S2, in which the television receiver starts blanking. Consequently, the display screen of the television receiver goes blank (in which no image is displayed).

In step S3, the television receiver executes input switching. At this moment, the supply source of a signal corresponding to an image to be displayed on the screen is switched from the tuner to the video input terminal, for example.

In step S4, the television receiver sets a register in accordance with the switched image signal supply source.

In step S5, the television receiver ends blanking. Subsequently, for example, the image control corresponding to the register set in step S4 is executed on the image corresponding to the signal supplied from the video input terminal and a resultant image is displayed on the screen.

Thus, the image control is executed.

However, as the number of registers to be controlled by software increases, it takes long to execute such processing as arithmetic operation and setting. Therefore, if complicated software control is executed, it takes longer to complete register setting, resulting in a longer blanking period. Control operations for analyzing the contents of video (or image) and dynamically reflecting the results of the analysis to register setting require the capturing of the video for a certain period of time for the analysis. In this case, it is also necessary to capture video during a blanking period to execute the analysis, thereby extending the blanking period by a time in which the video is captured.

In order to overcome the above-mentioned problems, methods were proposed in which the quality of an image is adjusted after displaying the image. For example, refer to Japanese Patent Laid-open No. 2000-307896 (referred to as Patent Document 1) and Japanese Patent Laid-open No. 2000-78496 (referred to as Patent Document 2) for more information.

SUMMARY OF THE INVENTION

The methods disclosed in the above-mentioned Patent Documents 1 and 2 execute dynamic image detection control, but do not consider the enhancement of the speed of the image control involved in input switching. Namely, these methods are intended to adjust image quality in accordance with moving pictures. Further, in these methods, in changing image registers in match with moving pictures, the adjustment matching an image displayed at that moment is not executed; but the settings obtained as a result of the analysis are set to the registers without change. Consequently, the quality of an image being displayed may remarkably change, thereby possibly giving the user a sense of visual discomfort.

Therefore, the present invention addresses the above-identified and other problems associated with related-art methods and apparatuses and solves the addressed problems by providing an image display apparatus and method, a program, and a recording media that are configured to realize high-speed image input switching as well as image displaying that minimizes the sense of visual discomfort.

In carrying out the invention and according to one embodiment thereof, there is provided an image display apparatus for displaying an image corresponding to a signal selected by a user from among a plurality of images corresponding to a plurality of input signals. This image display apparatus has: selection output means; feature quantity calculation means; status determination means; and image quality change means. The selection output means is configured to output a signal selected from among the plurality of signals on the basis of the selection. The feature quantity calculation means is configured to calculate a feature quantity indicative of a status of an image corresponding to the signal outputted by the selection output means. The status determination means is configured to determine the status of the image on the basis of the feature quantity calculated by the feature quantity calculation means. The image quality change means is configured to change a parameter for identifying an image quality of the image on the basis of the signal outputted by the selection output means and a determination result obtained by the status determination means.

The above-mentioned image display apparatus may further have display control means configured to control display of the image corresponding to the signal outputted by the selection output means, the image having been processed by the image quality change means.

In the above-mentioned image display apparatus, if the signal outputted by the selection output means is switched, the display control means blanks display of the image.

In the above-mentioned image display apparatus, the display control means blanks display of the image during a period of time from the selection by the user up to the switching of the signal outputted by the selection output means.

In the above-mentioned image display apparatus, the status determination means determines a change level of the image on the basis of the feature quantity calculated by the feature quantity calculation means and the image quality change means, if the change level of the image is greater than a predetermined threshold value, changes the parameter for identifying the image quality of the image to a value that is determined on the basis of the signal outputted by the selection output means.

In the above-mentioned image display apparatus, the status determination means determines a change level of the image on the basis of the feature quantity calculated by the feature quantity calculation means and the image quality change means, if the change level of the image is smaller than a predetermined threshold value, changes the parameter for identifying the image quality of the image to a value between a value to be determined on the basis of the signal outputted by the selection output means and a currently set value.

In the above-mentioned image display apparatus, the feature quantity calculation means divides the image corresponding to the signal outputted by the selection output means into a plurality of predetermined partitions, identifies a measuring point indicative of a position of a pixel of which value is to measure in each of the plurality of partitions, and calculates a variation indicative of a change of the image as the feature quantity thereof on the basis of a difference between a value of a pixel of the measuring point, the pixel corresponding to a first point of time, and a value of the pixel of the measuring point, the pixel corresponding to a second point of time after the first point of time by a predetermined period of time.

In carrying out the invention and according to another embodiment thereof, there is provided an image display method for an image display apparatus for displaying an image corresponding to a signal selected by user from among a plurality of images corresponding to a plurality of input signals. This image display method has the steps of: outputting a signal selected from among the plurality of signals on the basis of the selection; and calculating a feature quantity indicative of a status of an image corresponding to the signal outputted in the selection outputting step. The method further includes the steps of: determining the status of the image on the basis of the feature quantity calculated in the feature quantity calculating step; and changing a parameter for identifying an image quality of the image on the basis of the signal outputted on the selection outputting step and a determination result obtained in the status determining step.

In carrying out the invention and according to still another embodiment thereof, there is provided a computer-readable program for making an image display apparatus for displaying an image corresponding to a signal selected by a user from among a plurality of images corresponding to a plurality of input signals execute image display processing. This image display processing includes the steps of: outputting a signal selected from among the plurality of signals on the basis of the selection; and calculating a feature quantity indicative of a status of an image corresponding to the signal outputted in the selection outputting step. The image processing further includes the steps of: determining the status of the image on the basis of the feature quantity calculated in the feature quantity calculating step; and changing a parameter for identifying an image quality of the image on the basis of the signal outputted the selection outputting step and a determination result obtained in the status determining step.

In carrying out the invention and according to yet another embodiment thereof, there is provided a recording medium storing a computer-readable program for making an image display apparatus for displaying an image corresponding to a signal selected by a user from among a plurality of images corresponding to a plurality of input signals execute image display processing. This image display processing has the same steps that the above mentioned program executes.

According to one embodiment of the invention, an image can be displayed. In particular, switching between image input sources can be executed at high speeds and an image that is low in giving the sense of visual discomfort to the user can be displayed.

BRIEF DESCRIPTION OF THE DRAWINGS

FIG. 5 is a diagram illustrating an exemplary image shown in a display screen.

DETAILED DESCRIPTION OF THE PREFERRED EMBODIMENTS

Figure 1:
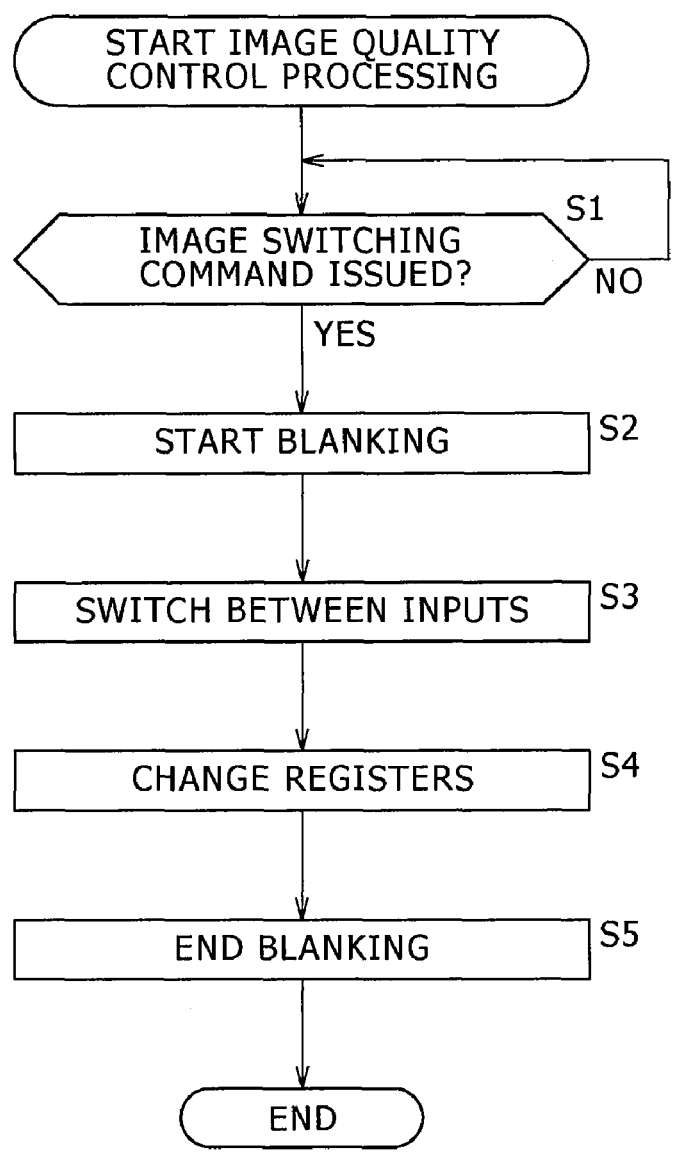
FIG. 1 is a flowchart indicative of an exemplary related-art image quality control processing.

This invention will be described in further detail by way of embodiments thereof with reference to the accompanying drawings. This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

An image display apparatus, according to one embodiment of the present invention, is for displaying an image corresponding to a signal selected by a user from among a plurality of images corresponding to a plurality of input signals. The apparatus includes: selection output means (for example, an input switching processing block 124 shown in FIG. 2); feature quantity calculation means (for example, a status decision processing block 125); status determination means (for example, a control block 129 shown in FIG. 2 for executing a process in step S106 illustrated in FIG. 3); and image quality change means (for example, an image quality processing block 126 shown in FIG. 2). The selection output means is configured to output a signal selected from among the plurality of signals on the basis of the selection. The feature quantity calculation means is configured to calculate a feature quantity indicative of a status of an image corresponding to the signal outputted by the selection output means. The status determination means is configured to determine the status of the image on the basis of the feature quantity calculated by the feature quantity calculation means. The image quality change means is configured to change a parameter for identifying an image quality of the image on the basis of the signal outputted by the selection output means and a determination result obtained by the status determination means.

The image display apparatus mentioned above can further includes display control means (for example, a blanking control block 127 shown in FIG. 2) configured to control display of the image corresponding to the signal outputted by the selection output means, the image having been processed by the image quality change means.

An image display method, according to one embodiment of the present invention, for an image display apparatus for displaying an image corresponding to a signal selected by user from among a plurality of images corresponding to a plurality of input signals, includes the following steps. The steps are: an outputting step (for example, a processing in step S103 illustrated in FIG. 3) for outputting a signal selected from among the plurality of signals on the basis of the selection; and a calculating step (for example, a processing in step S105 illustrated in FIG. 3) for calculating a feature quantity indicative of a status of an image corresponding to the signal outputted in the selection outputting step. Further, the steps includes: a determining step (for example, a processing in step S106 illustrated in FIG. 3) for determining the status of the image on the basis of the feature quantity calculated in the feature quantity calculating step; and a changing step (for example, a processing in step S107 or S108 illustrated in FIG. 3) for changing a parameter for identifying an image quality of the image on the basis of the signal outputted on the selection outputting step and a determination result obtained in the status determining step.

Figure 2:
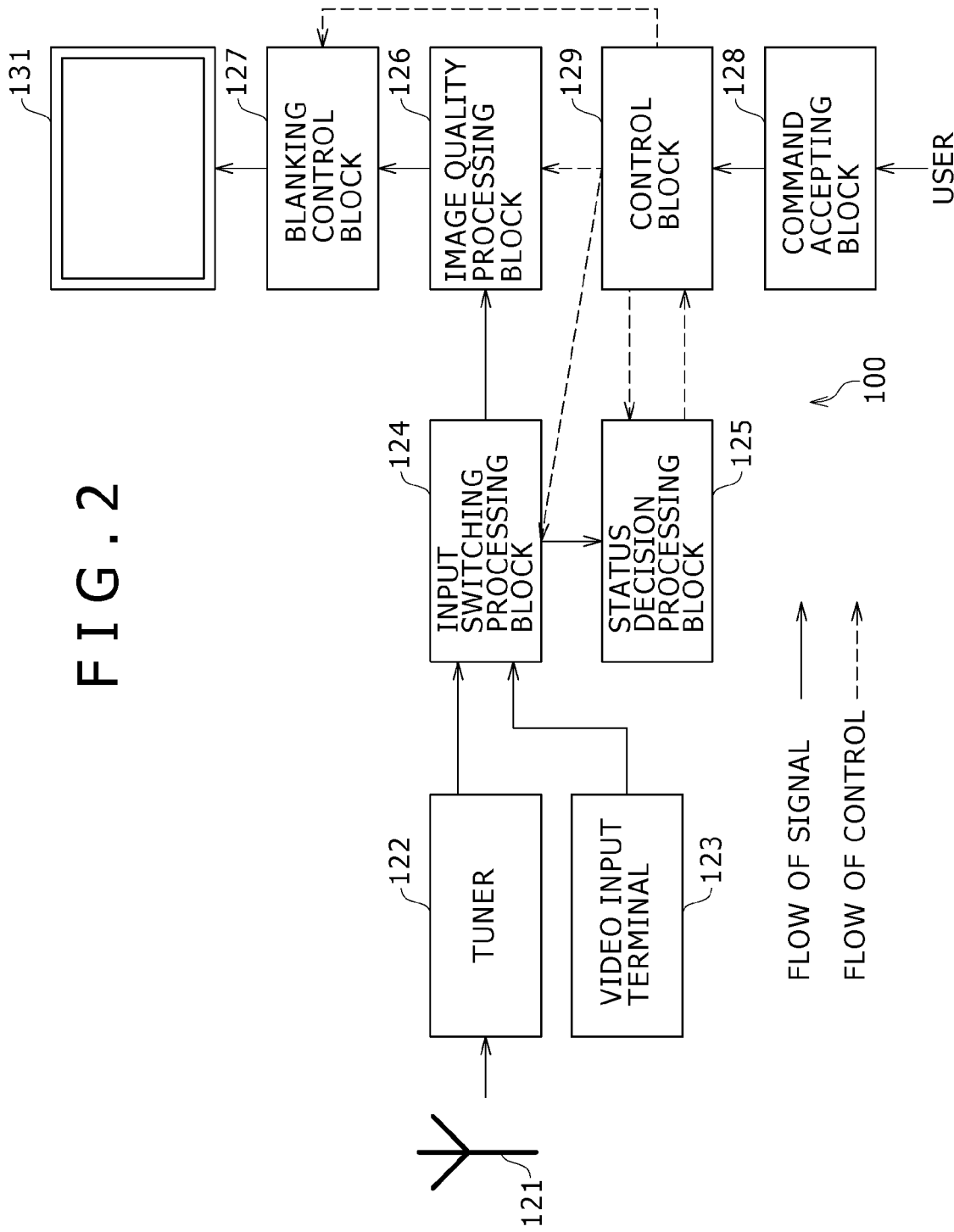
FIG. 2 is a schematic diagram illustrating an exemplary configuration of a television receiver practiced as one embodiment of the invention.

The following describes an embodiment of the present invention with reference to accompanying drawings. Referring to FIG. 2, there is shown an exemplary configuration of a television receiver 100 practiced as one embodiment of the invention. In the figure, solid-line arrows interconnecting functional blocks are signal lines for transmitting image-associated signals for example and dashed-line arrows are control lines for transmitting signals associated with control information for example.

In FIG. 2, a broadcast signal received at an antenna 121 is received by a tuner 122. Of the received broadcast signal, a composite video signal and an audio signal are demodulated on the basis of a predetermined channel signal and the demodulated signals are supplied to an input switching processing block 124.

The input switching processing block 124 outputs the composite video signal selected from the signals supplied from the tuner 122 or the video input terminal 123 to a status decision processing block 125 and an image quality processing block 126.

The status decision processing block 125 is a functional block that computes a variation of a currently display image on the basis of the composite video signal supplied from the input switching processing block 124, thereby determining the status of the image. The determined image status is supplied to the image quality processing block 126 via a control block 129. The variation of image will be described later.

The image quality processing block 126 executes the processing associated with image quality control by separating the composite video signal supplied from the input switching processing block 124 into a luminance signal and a chrominance signal, converts the chrominance signal into a color-difference signal, and sets registers configured by parameters for specifying preset luminance and color shade so as to control picture, brightness, and so on and correct image distortion, generates RGB signals for driving a display 131, and outputs the generated RGB signals to a blanking control block 127. The processing associated with image quality control by the image quality processing block 126 is executed by the image status determined by the status decision processing block 125 supplied through the control block 129.

The blanking control block 127 outputs the RGB signals supplied from the image quality processing block 126 to drive the display 131 to the display 131 and, under the control of the control block 129, executes blanking (in which no image is displayed). Namely, the image display on the display 131 is controlled by the blanking control block 127 such that the displaying is blanked at a given time for a given period.

The display 131 is configured by a liquid crystal display (LCD) or a plasma display panel (PDP), for example, displaying images on a screen formed on the display 131.

A command accepting block 128 receives an infrared signal indicative of a user command outputted from a remote commander, not shown, and supplies the received command to the control block 129.

The control block 129, configured by a small-size computer having a CPU, a RAM, and so on, for example, executes various kinds of processing on the basis of the command supplied from the command accepting block 128, thereby controlling the television receiver 100 in its entirety.

In the above, the processing and output associated with images have been mainly described. In the television receiver 100, the processing and output associated with audio are also executed. For example, an audio signal supplied from the tuner 122 or a video input terminal 123 is processed by an audio processor and an amplifier, both not shown, and the processed audio signal is sounded from a speaker incorporated in the display 131.

Figure 3:
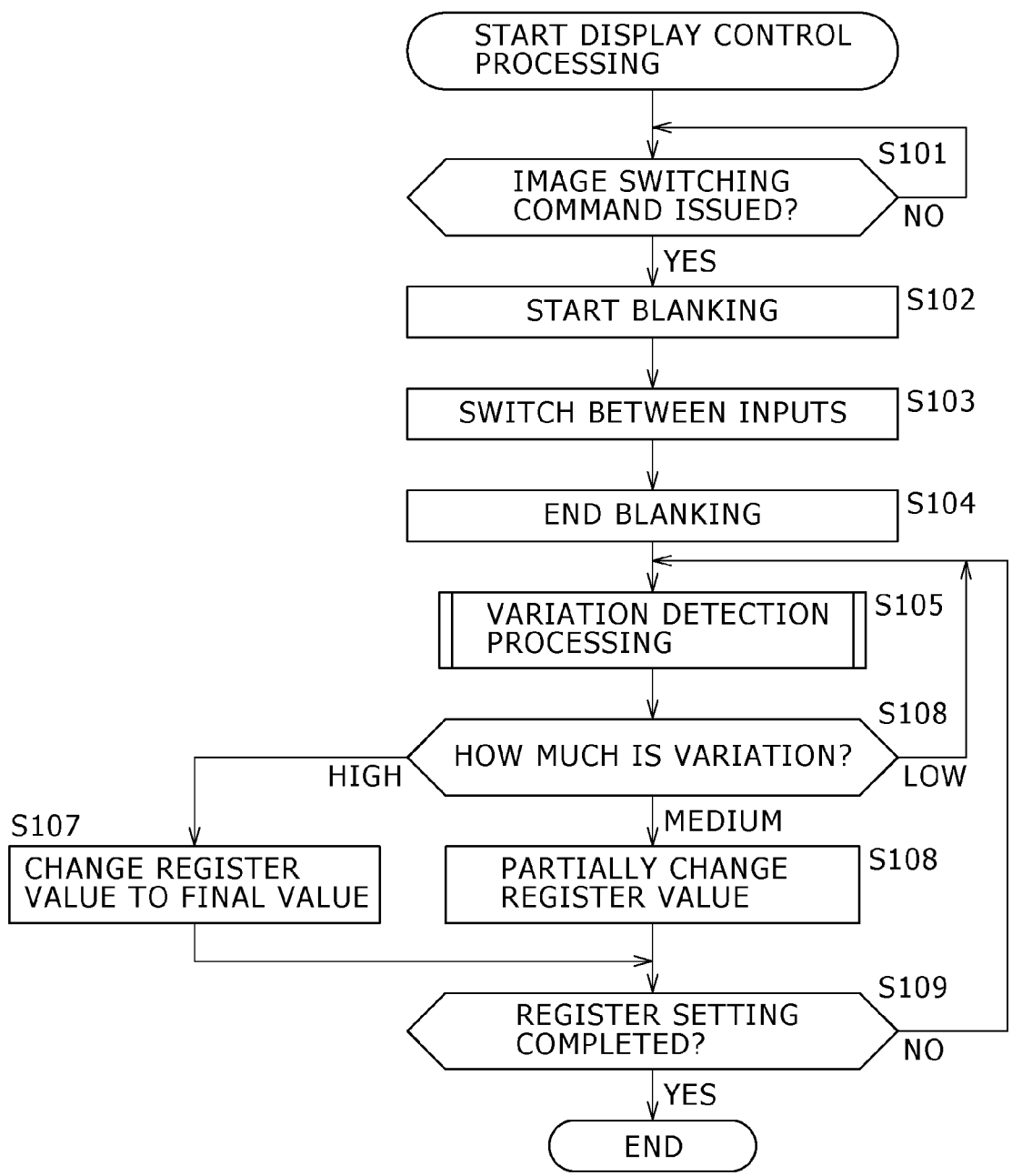
FIG. 3 is a flowchart indicative of exemplary display control processing.

The following describes image display control processing to be executed in the television receiver 100 with reference to the flowchart shown in FIG. 3.

In step S101, the control block 129 determines whether image switching has been commanded and waits until an image switching command comes. For example, if a user command from the remote commander received through the command accepting block 128 is for switching the image signal supply source from the tuner 122 to the video input terminal 123 or for displaying an image corresponding to the signal of a channel other than the channel selected so far among the signals supplied from the tuner 122, then it is determined in step S101 that image switching has been commanded, upon which the procedure goes to step S102.

In step S102, the control block 129 controls the blanking control block 127 to start the blanking in the image shown on the display 131. Consequently, the display 131 is blanked (for example, the screen of the display 131 is turned black).

In step S103, the control block 129 controls the input switching processing block 124 to switch between image signal inputs. For example, if the switching of the image signal source from the tuner 122 to the video input terminal 123 was command in step S101, then the control block 129, having outputted a signal supplied from the tuner 122 to the image quality processing block 126 and the status decision processing block 125, executes image signal switching so as to output a signal supplied from the video input terminal 123 to the image quality processing block 126 and the status decision processing block 125 in step S103.

In step S104, the control block 129 controls the blanking control block 127 to end the blanking in the image shown on the display 131. Consequently, the image corresponding to the signal supplied from the video input terminal 123 is shown on the display 131.

In step S105, the control block 129 controls the status decision processing block 125 to execute the variation detection processing to be described later with reference to FIG. 4. Consequently, a variation of the currently displayed image (in this example, the image corresponding to the signal supplied from the video input terminal 123) is computed.

Figure 4:
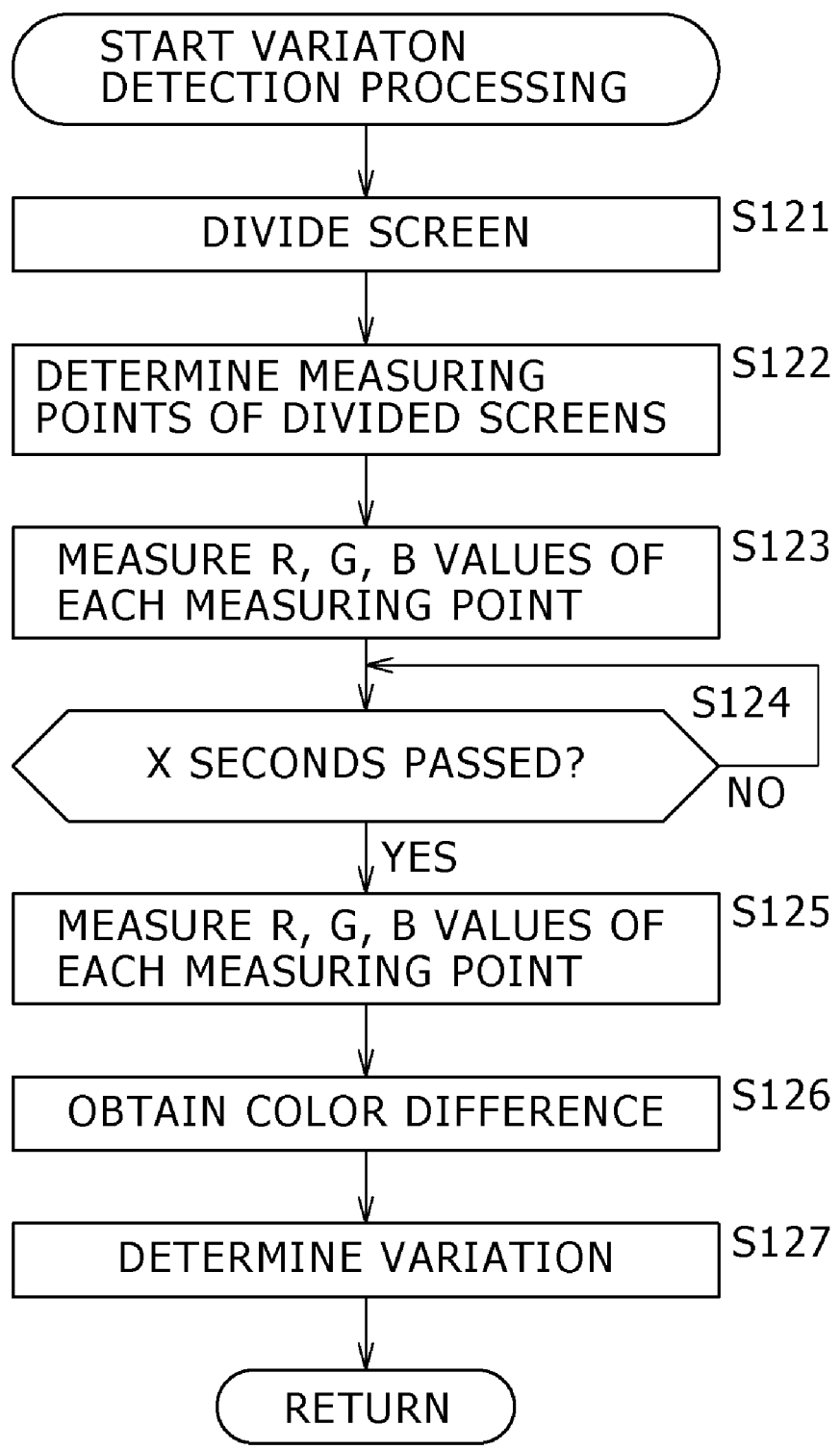
FIG. 4 is a flowchart indicative of exemplary variation detection processing.

The following details the variation detection processing of step S105 shown in FIG. 2 with reference to the flowchart shown in FIG. 4.

In step S121, the status decision processing block 125 divides the screen currently shown on the display 131 into a plurality of partitions.

In step S122, the status decision processing block 125 determines measuring points of each of the partitions. At this moment, the screen on the display 131 is partitioned as shown in FIG. 5, for example.

FIG. 5 shows an exemplary image to be shown on the display 131. In the figure, the screen is partitioned by horizontal and vertical dotted lines. In the processing of step S121, the screen is partitioned as shown. In this example, the number of partitions is 20 (=5×4).

In the figure, each measuring point is indicated by a circle hatched inside. In the processing of step S122, the measuring points are determined as shown. In this example, four measuring points are arranged in each partition. The position of each measuring point may be determined arbitrarily or by a predetermined method.

The processes of steps S121 and 122 are actually executed on the pixels making up each image. After the processes of steps S121 and S122, the pixels corresponding to the partitions obtained in step S121 and the pixels corresponding to the measuring points determined in step S122 are identified.

Referring to FIG. 4 again, after the process of step S122, the status decision processing block 125 measures, in step S123, the RGB value of each measuring point determined in step S122. At this moment, the RGB value is obtained for each of 80 (=20×4) measuring points, four measuring points in 20 partitions shown in FIG. 5.

In step S124, the status decision processing block 125 determines whether a predetermined time (x seconds for example) has passed and waits until that time has passed. Namely, after the process of step S123 and the passing of x seconds, the process of step S125 starts.

In step S125, the status decision processing block 125 measures again the RGB value of the pixel of each measuring point determined in step S122. At this moment, too, the RGB value is obtained for each of 80 (=20×4) measuring points.

In step S126, the status decision processing block 125 obtains a color difference on the basis of the RGB value of the pixel of each measuring point obtained in step S123 and the RGB value of the pixel of each measuring point obtained in step S125. The color difference is obtained as follows.

Let the RGB value measured in step S123 for the pixel of the first measuring point in the first partition be R1, G1, and B1 and the RGB value measure in step S125 for the pixel of the first measuring point in the first partition be R2, G2, and B2, then color difference V(1, 1) of the pixel of the first measuring point in the first partition is obtained from equation (1) below:

$$V(1, 1) = \sqrt{(R1-R2)^2} + \sqrt{(G1-G2)^2} + \sqrt{(B1-B2)^2} \quad \text{[Equation 1]}$$

Likewise, color difference V(1, 2) of the pixel of the second measuring point of the first partition, color difference V(1, 3) of the pixel of the third measuring point of the first partition, color difference V(1, 4) of the pixel of the fourth measuring point of the first partition, color difference V(2, 1) of the pixel of the first measuring point of the second partition, and so on are obtained up to a total of 80.

In step S127, the status decision processing block 125 determines a variation of the image on the basis of the color differences obtained in step S126. It should be noted that the variation may be a simple average of the above-mentioned 80 color differences or any value obtained by executing a predetermined computation such as weighting on the color differences of the measuring point of the center partition among the above-mentioned 80 color differences, for example.

The variation of each screen is obtained as described above. Since the variation of each image is obtained by dividing each screen into a plurality of partitions and on the basis of the color differences of a plurality of measuring points in each partition, the variation can be obtained that correctly represents the degree of change of an entire screen.

Referring FIG. 3 again, after the process of step S105, the control block 129 determines a level of the variation computed in the status decision processing block 125. At this moment, the variation computed in step S105 is determined to be at low level, medium level, or high level, for example, on the basis of predetermined threshold values. For example, if threshold value s1 and threshold value s2 that is greater than s1 are set in advance, then any variations below threshold value s1 are regarded as at low level, any variations equal to or greater than threshold value s1 and less than threshold value s2 are regarded as at medium level, and any variations equal to or greater than threshold value s2 are regarded as at high level.

In step S106, if the variation obtained in step S105 is found to be at high level, then the procedure goes to step S107, in which the control block 129 controls the image quality processing block 126 to set a register configured by parameters for specifying luminance and color shade for example to a final value. The final value corresponds to an ideal setting status of the register determined in correspondence to an image currently shown on the display 131 (in this example, an image corresponding to the signal supplied from the video input terminal 123). For example, this final value is automatically computed by the image quality processing block 126 on the basis of the signal supplied from the input switching processing block 124.

If the variation obtained in step S105 is found to be at high level, the image currently shown on the display 131 is considered to be an image large in movement (or change) (namely, a moving image). Therefore, if the quality of this image is quickly brought to a final image quality (namely, an image quality to be obtained when the register is set to the final value) by changing the image quality somewhat rapidly in a scene of movement, this image hardly imparts the sense of visual discomfort, making the user be aware of this change.

In step S106, if the variation computed in step S105 is found to be at medium level, then the procedure goes to step S108, in which the control block 129 controls the image quality processing block 126 to partially change the register setting value without setting to the final value.

If the variation computed in step S105 is found to be at medium level, it is considered that the image (or the moving image) currently shown on the display 131 is not so large in movement, so that, if the quality of such an image is rapidly changed to quickly bring the image quality to a final quality (an image quality to be obtained when the register is set to the final value), the user possibly feels the sense of visual discomfort. Therefore, with images that are small in movement, the register values are partially changed so as to change the by taking time, thereby minimizing the sense of visual discomfort to be given to the user. For example, the value of each parameter in the register is set between the current setting value and the final value or the parameters are given priority in advance to change the setting values of only the parameters of higher priority.

If the variation computed in step S105 is found to be at low level in step S106, the changing of register setting value is not executed and the procedure returns to step S105.

If the variation computed in step S105 is found to be at low level, then it is considered that the image currently shown on the display 131 has little movement (or change). In a scene having no movement, changing the quality of such an image give the user the sense of visual discomfort. Therefore, with images having no movement, the register setting values are not changed, but the variation detection processing is executed again to wait for a scene in which the image shown on the display 131 comes to have a larger variation (or a larger movement).

After step S107 or S108, the procedure goes to step S109, in which the control block 129 determines whether the register setting has been completed. If the register has already been set to the final value, then the register setting is determined completed in step S109, upon which the processing described so far ends. On the other hand, if the register has not yet been set to the final value, the register setting is determined completed in step S109, upon which the procedure returns to step S105.

As described above, the image quality is changed and the resultant image is displayed. Because the register setting values are changed in accordance with the movement of each image, the image quality can be rapidly changed in a relatively fast moving scene to reduce the time necessary for the image input switching processing, while, in a relatively slow moving scene, the image quality is slowly changed, thereby minimizing the sense of visual discomfort to be given to the user at the time of image input switching.

As described above, the processing associated with the changing of image quality is executed after the end of blanking, so that the blanking time can be reduced. For example, this minimizes chances for the user to miss out scenes that he wants to catch, thereby enhancing user convenience.

Figure 6:
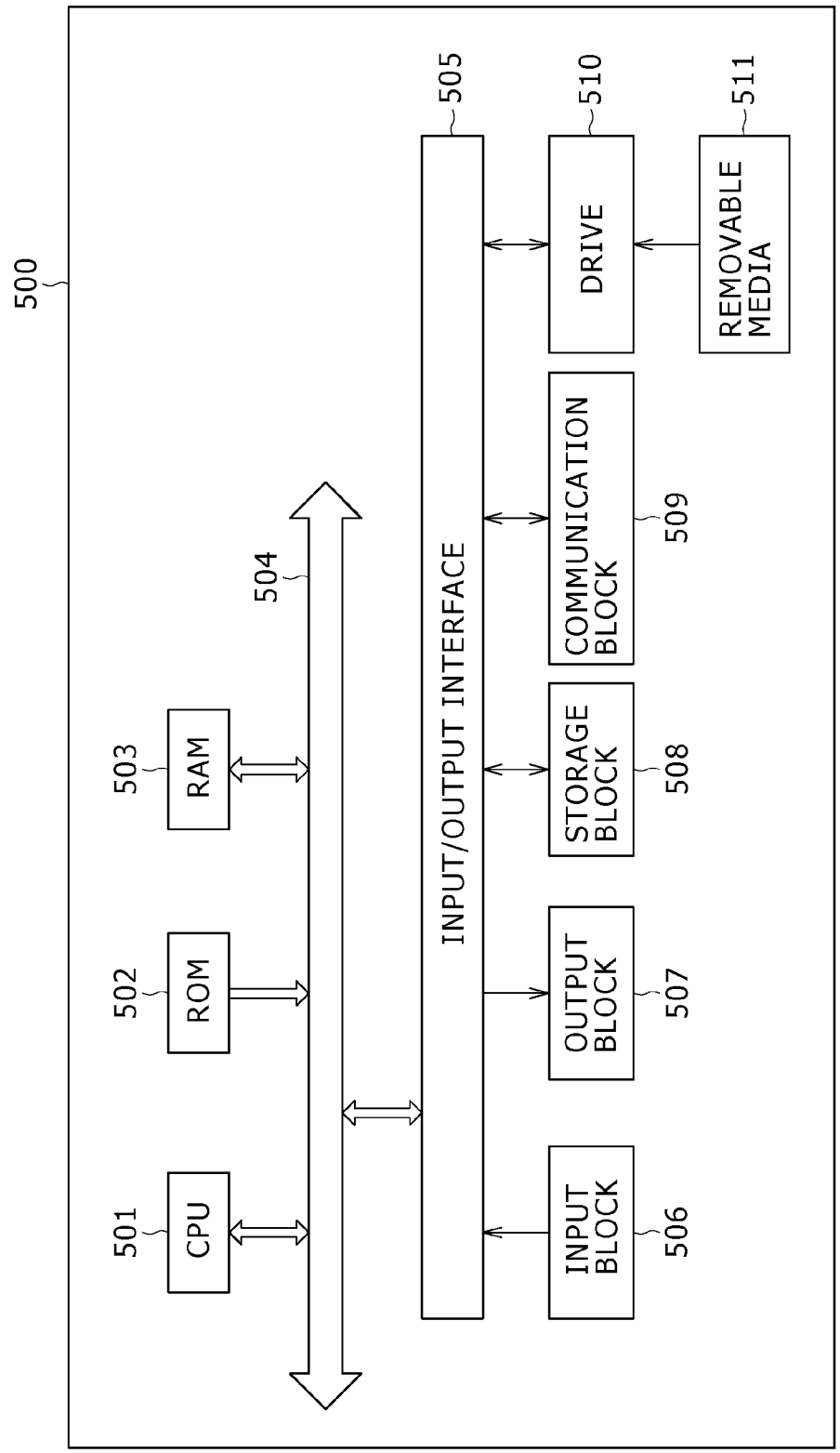
FIG. 6 is a block diagram illustrating an exemplary configuration of a personal computer.

In the above-mentioned description of one embodiment of the invention, a television receiver is used for example. The present invention may also be embodied in a general-purpose personal computer, for example. Referring to FIG. 6, there is shown a block diagram illustrating an exemplary configuration of a personal computer 500 practiced as another embodiment of the invention.

As shown in FIG. 6, a CPU (Central Processing Unit) 501 executes various kinds of processing as directed by a program stored in a ROM (Read Only Memory) 502 or a program loaded from a storage block 508 into a RAM (Random Access Memory) 503. The RAM 503 also appropriately stores data necessary for the CPU 501 to execute various kinds of processing.

The CPU 501, the ROM 502, and the RAM 503 are interconnected by a bus 504. The bus 504 is also connected to an input/output interface 505.

The input/output interface 505 is connected to an input block 506 based on a keyboard and a mouse for example, an output block 507 based on a display monitor such as an LCD (Liquid Crystal Display) panel and a loudspeaker for example, a storage block 508 based on a hard disk drive for example, and a communication block 509 based on a modem and a network interface card such as a LAN card for example. The communication block 509 executes communication processing through a network such as the Internet.

The input/output interface 505 is also connected to a drive 510 as required, on which a removable media 511 such as a magnetic disk, an optical disk, a magneto-optical disk, or a semiconductor memory is appropriately loaded. From the loaded removable media, a computer program is installed in the storage block 508 as required.

The above-mentioned sequence of processing operations may be executed by software as well as hardware. When the above-mentioned sequence of processing operations is executed by software, the programs constituting the software are installed from a network such as the Internet or a recording media such as the removable media 511.

As shown in FIG. 6, the above-mentioned recording media is constituted by not only the removable media 511 made up of a magnetic disk (including floppy disk (trademark)), an optical disk (including CD-ROM (Compact Disk Read Only Memory) and DVD (Digital Versatile Disk)), a magneto-optical disk (including MD (Mini Disk) (trademark)), or a semiconductor memory which is distributed separately from the apparatus itself, but also the ROM 502 or the storage block 508 which stores programs and is provided to users as incorporated in the apparatus itself.

It should be noted herein that the steps for describing each program recorded in recording media include not only the processing operations which are sequentially executed in a time-dependent manner but also the processing operations which are executed concurrently or discretely.

While preferred embodiments of the present invention have been described using specific terms, such description is for illustrative purpose only, and it is to be understood that changes and variations may be made without departing from the spirit or scope of the following claims.

What is claimed is:

1. An image display apparatus for displaying an image corresponding to a signal selected by a user from among a plurality of images corresponding to a plurality of input signals, comprising:
   selection output means configured to output a signal selected from among said plurality of signals on the basis of the selection;
   feature quantity calculation means configured to calculate a feature quantity indicative of a status of an image corresponding to said signal outputted by said selection output means, divide said image into a plurality of partitions, identify a plurality of measuring points associated with pixels within each of the plurality of partitions, determine RGB values for each of said plurality of measuring points, and compare RGB values for each of said plurality of measuring points against previously determined RGB values for each of said plurality of portions to determine color differences associated with said feature quantity for the image display;
   status determination means configured to determine said status of said image on the basis of the feature quantity calculated by said feature quantity calculation means, said status includes a plurality of change levels associated with said color differences, said plurality of change levels include at least low, medium, and high, and said plurality of change levels are separated by threshold values distinguishing said color differences; and
   image quality change means configured to change a parameter for identifying an image quality of said image on the basis of said signal outputted by said selection output means and a determination result obtained by said status determination means.

2. The image display apparatus according to claim 1, further comprising
   display control means configured to control display of said image corresponding to said signal outputted by said selection output means, said image having been processed by said image quality change means.

3. The image display apparatus according to claim 2, wherein, if said signal outputted by said selection output means is switched, said display control means blanks display of said image.

4. The image display apparatus according to claim 3, wherein said display control means blanks display of said image during a period of time from said selection by the user up to the switching of said signal outputted by said selection output means.

5. The image display apparatus according to claim 1, wherein
said status determination means determines said one of said plurality of change levels of said image on the basis of said feature quantity calculated by said feature quantity calculation means, and
said image quality change means, if said change level of said image is greater than a predetermined threshold value, changes said parameter for identifying the image quality of said image to a value that is determined on the basis of said signal outputted by said selection output means.

6. The image display apparatus according to claim 1, wherein
said status determination means determines said one of said plurality of change levels of said image on the basis of said feature quantity calculated by said feature quantity calculation means, and
said image quality change means, if said change level of said image is smaller than a predetermined threshold value, changes said parameter for identifying the image quality of said image to a value between a value to be determined on the basis of said signal outputted by said selection output means and a currently set value.

7. The image display apparatus according to claim 1, wherein the plurality of change levels include at least low, medium, and high, the plurality of change levels are separated by threshold values distinguishing said color differences.

8. An image display method for an image display apparatus for displaying an image corresponding to a signal selected by user from among a plurality of images corresponding to a plurality of input signals, comprising the steps of:
outputting a signal selected from among said plurality of signals on the basis of the selection;
calculating a feature quantity indicative of a status of an image corresponding to said signal outputted in the selection outputting step, during said calculating said image is divided into a plurality of partitions, a plurality of measuring points within each of the plurality of partitions identify a position of pixels at a time interval, RGB values are determined for each of said plurality of measuring points, and each of said plurality of measuring points are compared against previous measuring points for each of said plurality of portions to determine color differences associated with said feature quantity for the image display;
determining said status of said image on the basis of the feature quantity calculated in the feature quantity calculating step, said status includes of a plurality of change levels associated with said color differences, said plurality of change levels include at least low, medium, and high, and said plurality of change levels are separated by threshold values distinguishing said color differences; and
changing a parameter for identifying an image quality of said image on the basis of said signal outputted on the selection outputting step and a determination result obtained in the status determining step.

9. A non-transitory computer readable medium having stored thereon computer executable instructions for displaying, via an image display apparatus, an image corresponding to a signal selected by a user from among a plurality of images corresponding to a plurality of input signals, said instructions comprising:
outputting a signal selected from among said plurality of signals on the basis of the selection;
calculating a feature quantity indicative of a status of an image corresponding to said signal outputted in the selection outputting step, during said calculating (a) said image is divided into a plurality of partitions, (b) a plurality of measuring points within each of the plurality of partitions identify a position of pixels at a time interval, (c) RGB values are determined for each of said plurality of measuring points, and (d) each of said plurality of measuring points are compared against previous measuring points for each of said plurality of portions to determine color differences associated with said feature quantity for the image display;
determining said status of said image on the basis of the feature quantity calculated in the feature quantity calculating step, said status includes of a plurality of change levels associated with said color differences, said plurality of change levels include at least low, medium, and high, and said plurality of change levels are separated by threshold values distinguishing said color differences; and
changing a parameter for identifying an image quality of said image on the basis of said signal outputted the selection outputting step and a determination result obtained in the status determining step.

10. An image display apparatus for displaying an image corresponding to a signal selected by a user from among a plurality of images corresponding to a plurality of input signals, comprising:
a selection outputter configured to output a signal selected from among said plurality of signals on the basis of the selection;
a feature quantity calculator configured to calculate a feature quantity indicative of a status of an image corresponding to said signal outputted by said selection outputter, said feature quantity calculator is further configured to divide said image into a plurality of partitions, identify a plurality of measuring points associated with pixels within each of the plurality of partitions, determine RGB values for each of said plurality of measuring points, and compare RGB values for each of said plurality of measuring points against previously determined RGB values for each of said plurality of portions to determine color differences associated with said feature quantity for the image display;
a status determiner configured to determine said status of said image on the basis of the feature quantity calculated by said feature quantity calculator, said status includes a plurality of change levels associated with said color differences, said plurality of change levels include at least low, medium, and high, and said plurality of change levels are separated by threshold values distinguishing said color differences; and
an image quality changer configured to change a parameter for identifying an image quality of said image on the basis of said signal outputted by said selection outputter and a determination result obtained by said status determiner.

* * * * *